(12) United States Patent
Karau

(10) Patent No.: US 10,059,043 B2
(45) Date of Patent: Aug. 28, 2018

(54) METHOD AND APPARATUS FOR DRY CAST FACING CONCRETE DEPOSITION

(71) Applicant: PAVESTONE, LLC, Atlanta, GA (US)

(72) Inventor: William H. Karau, Southlake, TX (US)

(73) Assignee: PAVESTONE, LLC, Atlanta, GA (US)

( * ) Notice: Subject to any disclaimer, the term of this patent is extended or adjusted under 35 U.S.C. 154(b) by 0 days.

(21) Appl. No.: 15/645,715

(22) Filed: Jul. 10, 2017

(65) Prior Publication Data

US 2017/0305042 A1   Oct. 26, 2017

Related U.S. Application Data

(62) Division of application No. 14/311,189, filed on Jun. 20, 2014, now Pat. No. 9,701,046.

(60) Provisional application No. 61/838,205, filed on Jun. 21, 2013.

(51) Int. Cl.
| | |
|---|---|
| *B29C 41/36* | (2006.01) |
| *B29C 43/02* | (2006.01) |
| *E02D 29/02* | (2006.01) |
| *E04C 1/00* | (2006.01) |
| *B28B 7/00* | (2006.01) |
| *B28B 7/18* | (2006.01) |
| *E04B 2/32* | (2006.01) |
| *E04C 1/39* | (2006.01) |
| *E04B 2/02* | (2006.01) |

(52) U.S. Cl.
CPC ............... *B29C 41/36* (2013.01); *B28B 7/00* (2013.01); *B28B 7/0097* (2013.01); *B28B 7/183* (2013.01); *E02D 29/02* (2013.01); *E02D 29/025* (2013.01); *E02D 29/0266* (2013.01); *E04B 2/32* (2013.01); *E04C 1/00* (2013.01); *E04C 1/395* (2013.01); *E04B 2002/0208* (2013.01); *E04B 2002/0269* (2013.01)

(58) Field of Classification Search
CPC ......... B29C 41/36; B28B 7/00; B28B 7/0097; B28B 7/183
USPC ....................................................... 264/113
See application file for complete search history.

(56) References Cited

U.S. PATENT DOCUMENTS

| | | | | |
|---|---|---|---|---|
| 3,810,726 A * | 5/1974 | Bjorhaag | ................ | B28B 1/093 425/111 |
| 6,352,236 B1 * | 3/2002 | Aaseth | .................... | B28B 3/022 249/119 |
| 6,474,371 B1 * | 11/2002 | Ogawa | .................. | B30B 11/022 141/100 |
| 7,980,843 B2 * | 7/2011 | Zimmerman | ............ | B28B 1/29 425/147 |

* cited by examiner

*Primary Examiner* — Joseph S Del Sole
*Assistant Examiner* — Thu Khanh T Nguyen
(74) *Attorney, Agent, or Firm* — Jackson Walker LLP; Christopher J. Rourk

(57) ABSTRACT

An apparatus and method for manufacturing masonry blocks using a face mix shuttle comprising an angled shovel for depositing a controllable amount of face mix onto a surface of a masonry block.

20 Claims, 15 Drawing Sheets

METHOD AND APPARATUS FOR DRY CAST FACING CONCRETE DEPOSITION

RELATED APPLICATIONS

The present application is a divisional of U.S. patent application Ser. No. 14/311,189, filed Jun. 20, 2014, now U.S. Pat. No. 9,701,046, which claims benefit of U.S. Provisional Patent Application No. 61/838,205, entitled "Masonry Blocks," filed Jun. 21, 2013, which are hereby incorporated by references for all purposes.

TECHNICAL FIELD

The present disclosure relates to production of concrete blocks, and more specifically to a method and apparatus for controlling the dry cast facing of concrete blocks using a face mix shovel box.

BACKGROUND OF THE INVENTION

Concrete blocks are often molded using a mixture of different materials with various colors for aesthetic pleasure. However, it is difficult to control the distribution of the expensive, colorful materials used to create the multicolored concrete blocks leading to unpredictable results and wasted resources.

SUMMARY OF THE INVENTION

An apparatus and method for manufacturing masonry blocks using a face mix shuttle comprising an angled shovel for depositing a controllable amount of face mix onto a surface of a masonry block.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIGS. 1a-m are diagrams of a shovel box face mix paver machine and method of using such in accordance with an exemplary embodiment of the present disclosure;

DETAILED DESCRIPTION OF THE INVENTION

Figure 1A:
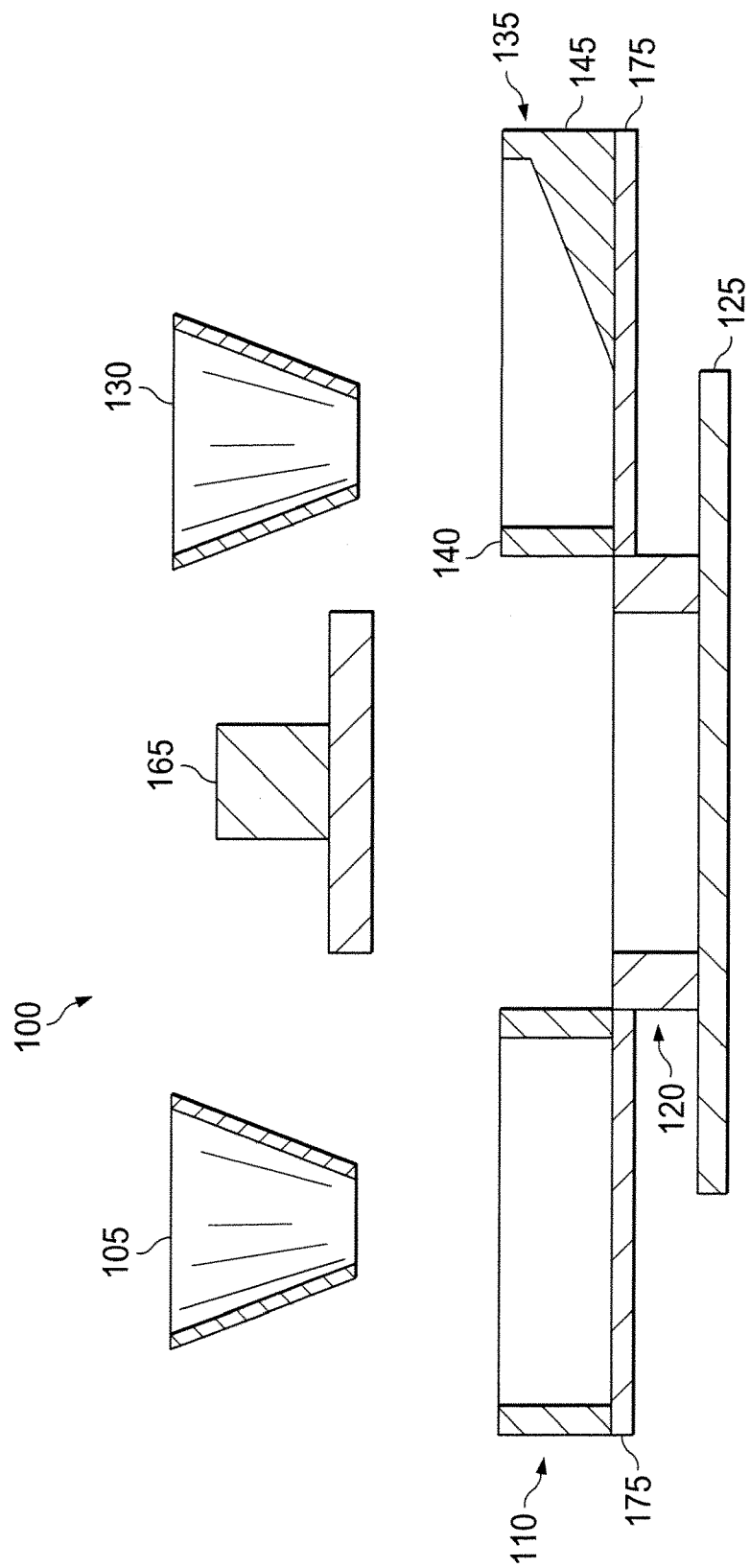

In the description that follows, like parts are marked throughout the specification and drawings with the same reference numerals. The drawing figures might not be to scale and certain components can be shown in generalized or schematic form and identified by commercial designations in the interest of clarity and conciseness.

Figure 1B:
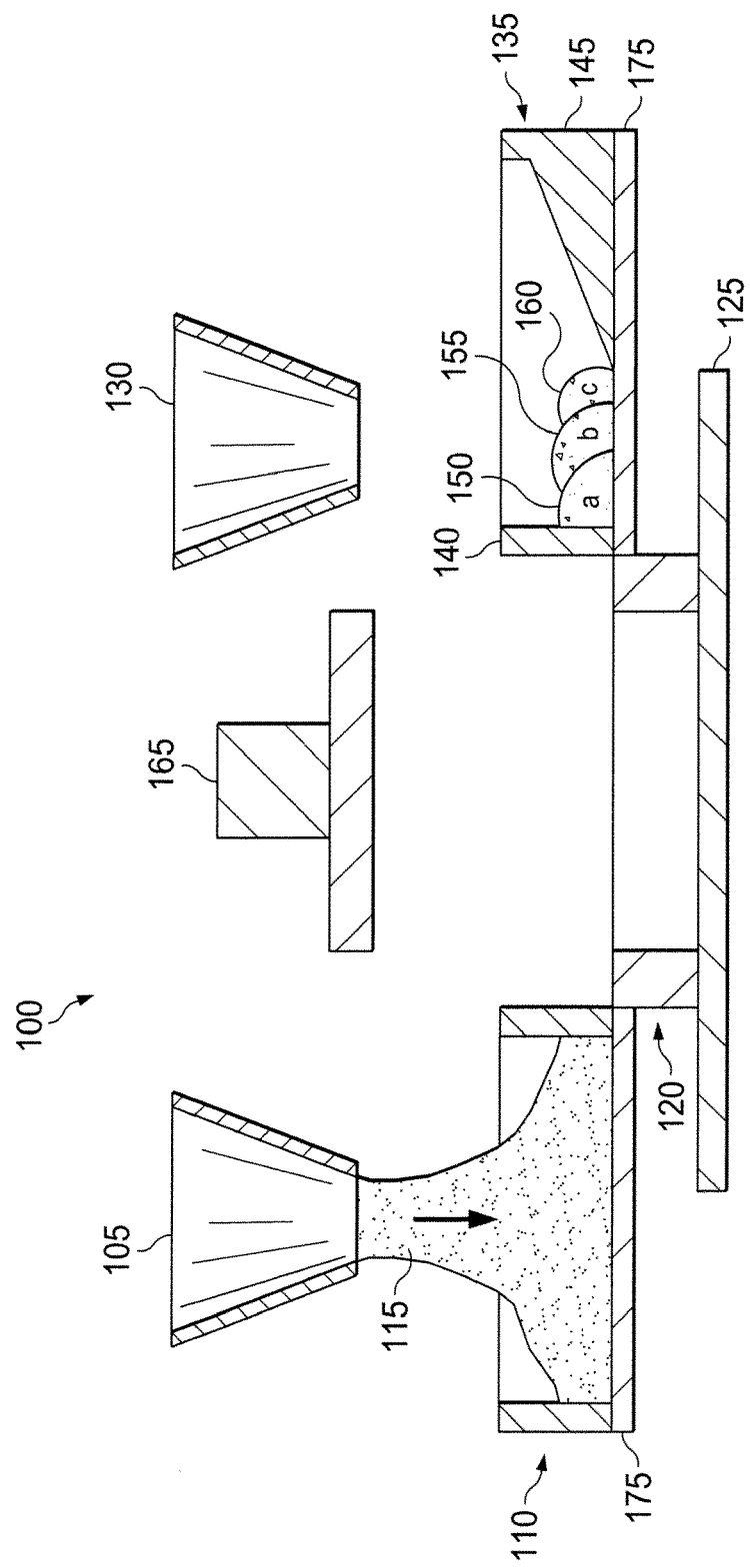
Figure 1C:
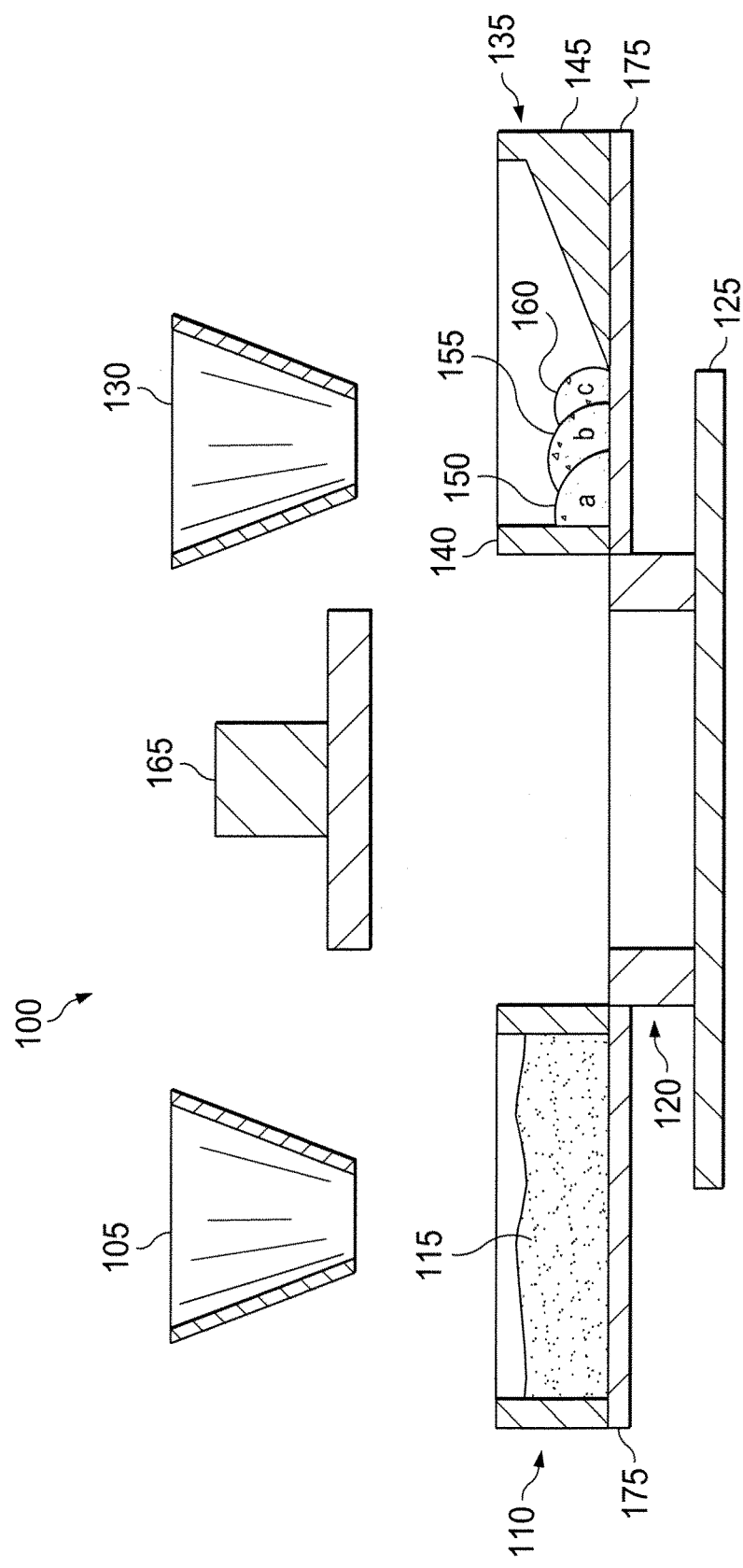

FIG. 1a is a diagram 100 of a shovel box face mix paver machine in accordance with an exemplary embodiment of the present disclosure. As shown in FIGS. 1a and 1b, the machine comprises a base mix chute 105 providing a base mix supply 115 to a base mix shuttle 110, a mold 120 configured to be placed into a loading zone on a steel plate 125, a face mix chute 130 providing face mix materials 150, 155, 160, to a face mix shuttle 135, and a press 165. Each of the components of the mold machine can be formed from steel or other suitable materials, and are typically disposed on an infrastructure assembly (not shown) that maintains the components in a predetermined position (such as for base mix chute 105 and face mix chute 130), or which provides a motive force for moving the component (such as for face mix shuttle 135 and press 165), as discussed further herein. In addition, supply conveyors (not shown) are provided to base mix chute 105 and face mix chute 130 to provide base mix materials and face mix materials.

In one embodiment of the present disclosure, face mix shuttle 135 comprises a retainer plate 140 and a shovel 145 which collectively operate to control the flow of face mix materials 150, 155, 160 into the mold.

FIGS. 1b-1m are diagrams showing various stages of operation of the mold machine 100. As shown in FIG. 1b, in the first stage of operation, base mix chute 105 provides base mix supply 115 to base mix shuttle 110. In one embodiment of the present disclosure, base mix supply 115 can be concrete, a mixture of concrete and other materials, or any other conventional semi-dry masonry material capable of serving as a base of the concrete or masonry blocks. It is understood that base mix supply 115 can be rough and functional with minimal aesthetic value. Base mix chute 105 can operate with any suitable conventional hopper or base mix storage unit to deliver base mix supply 115. In certain embodiments of the present disclosure, the amount of base mix supply 115 delivered to the base mix shuttle 110 can be enough that reloading is not necessary during each successive cycle of operating base mix shuttle 110.

Also during the stage of operation shown in FIG. 1b, face mix chute 130 provides face mix materials 150, 155, 160 to face mix shuttle 135 comprising of retainer plate 140 and shovel 145. Face mix materials 150, 155, 160 can be concrete, a mixture of concrete and other materials, or any other suitable conventional semi-dry material suitable for providing some aesthetic functionality to a surface of the concrete block. Face mix materials 150, 155, 160 are generally more expensive than base mix supply 115 and are of different colors or textures. In one embodiment of the present disclosure, face mix materials 150, 155, 160 can be separately deposited into face mix shuttle 135 by face mix chute 130 to prevent the mixing of the expensive, multicolored face mix materials. By keeping face mix materials 150, 155, 160 separate, it is possible to more precisely control the eventual placement and distribution of the colorful, aesthetically-pleasing face mix materials onto a surface of the concrete block.

Figure 1D:
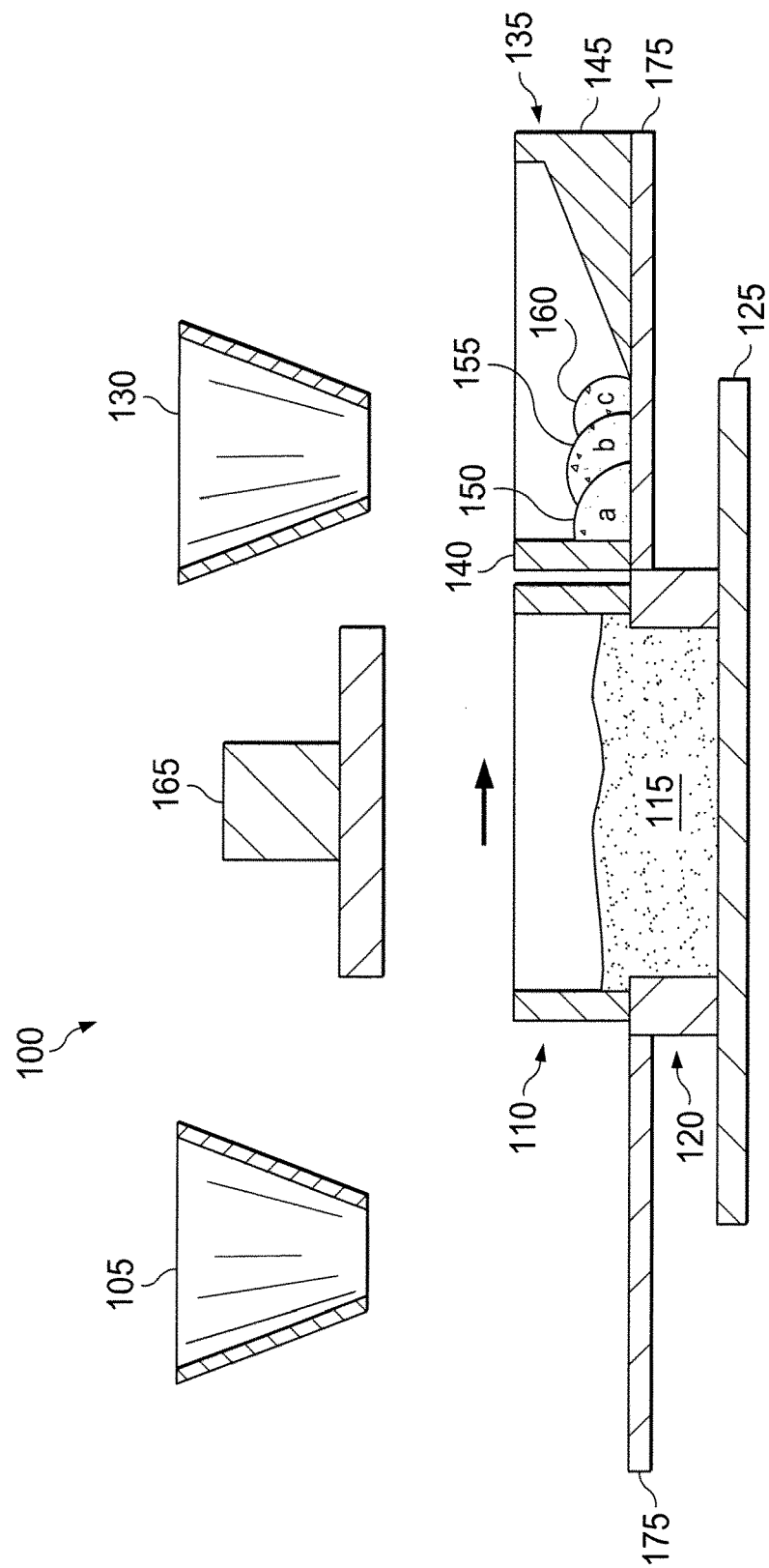
Figure 1E:
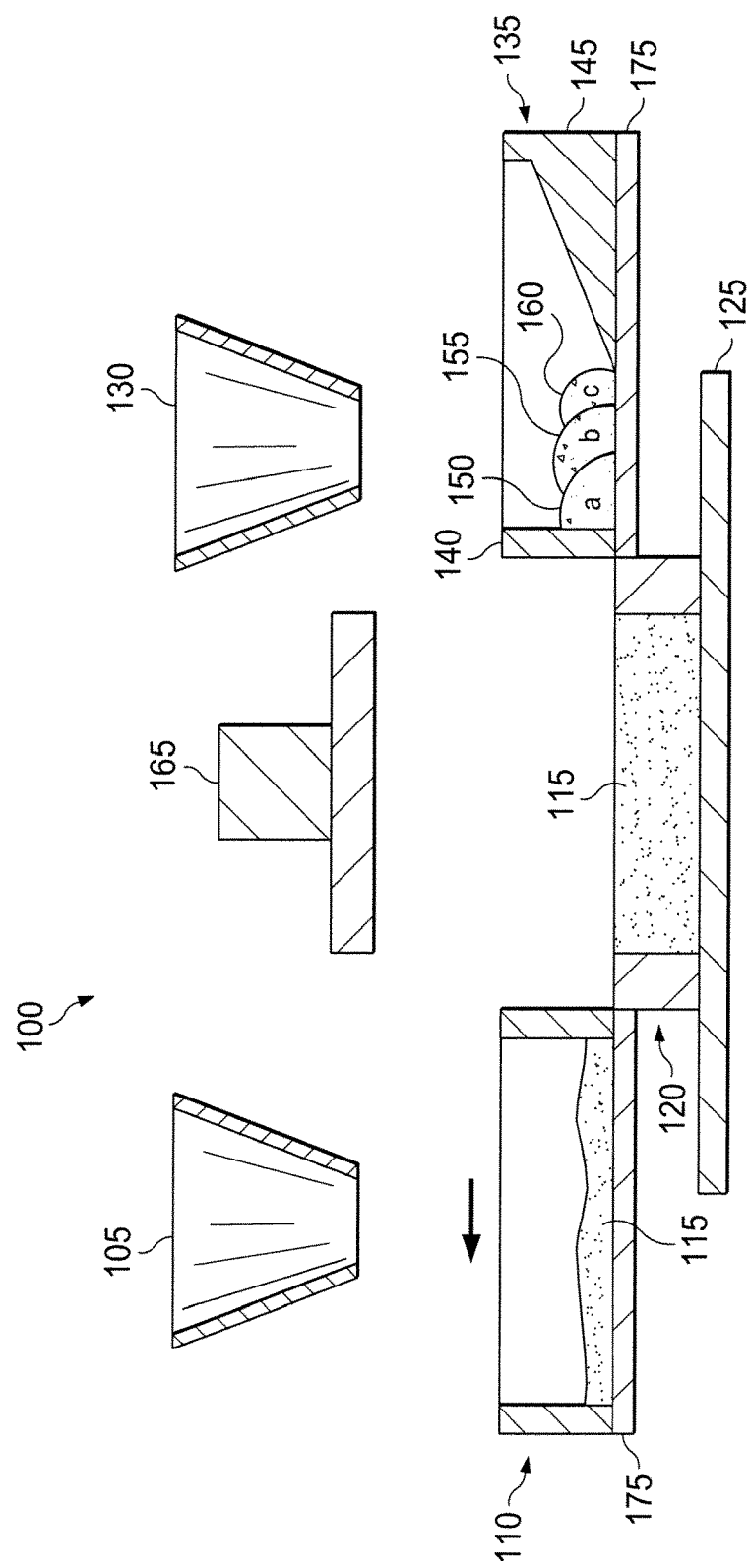

As shown in FIG. 1d, once base mix shuttle 110 has received base mix supply 115 from base mix chute 105, base mix shuttle 110 moves in a first reference direction over mold 120 placed on steel plate 125, as indicated by the arrow. As shown in FIG. 1e, once base mix shuttle 110 completes movement in the first reference direction, base mix shuttle 110 returns to the original position, as indicated by the arrow. While base mix shuttle 110 is traveling over the mold in the first reference direction and return trip, base mix shuttle 110 is depositing base mix supply 115 into mold 120.

Figure 1F:
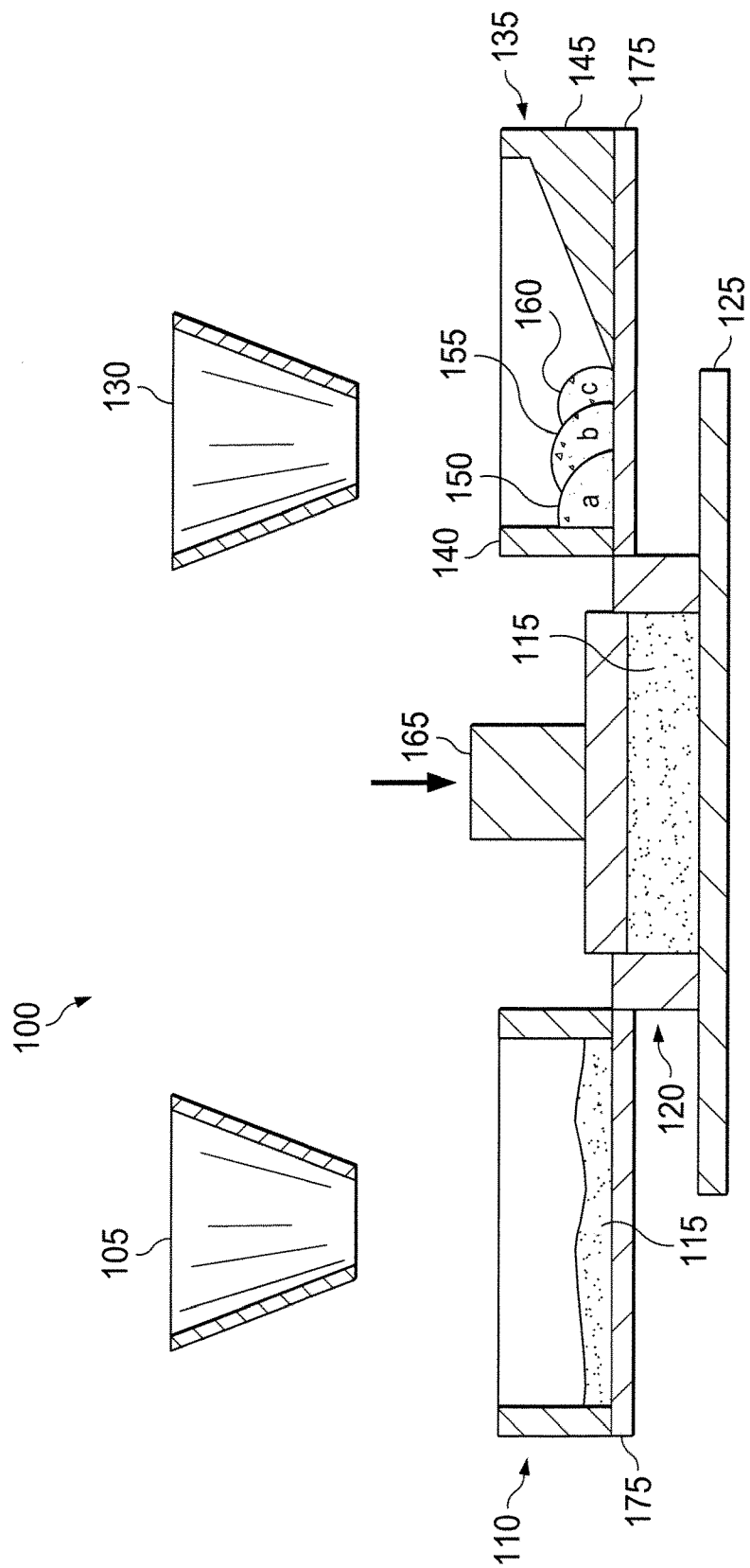
Figure 1G:
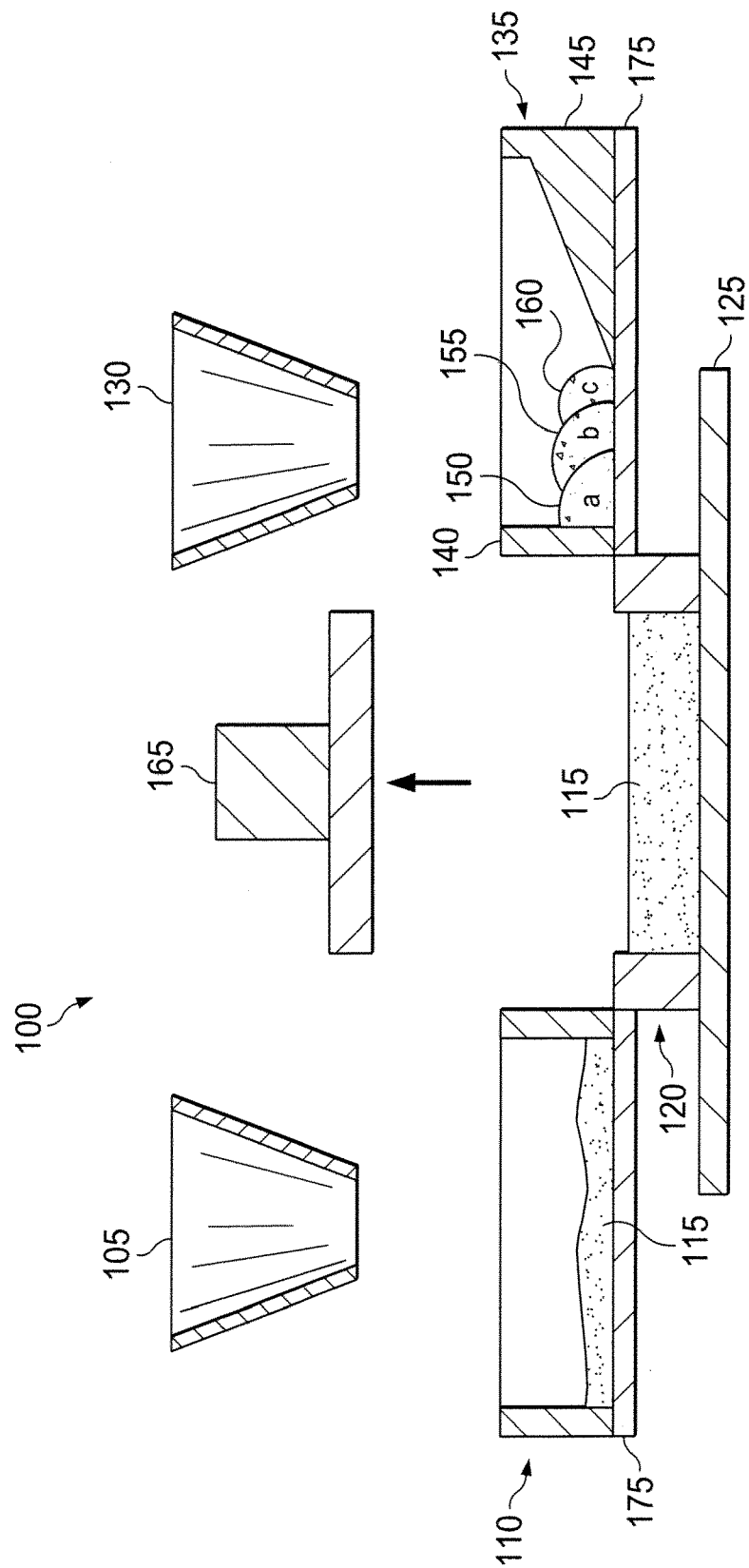

Referring now to FIGS. 1f-1g, once base mix supply 115 is deposited into mold 120, press 165 is lowered into mold 120 to deliver an intermediate tamp to base mix supply 115. During this intermediate tamp, a vibrating force can be applied to mold 120 containing base mix supply 115 to ensure that base mix supply 115 is evenly distributed from a suitable vibrating device (not shown). In one embodiment of the present disclosure, the vibrating force can be applied for about one-half second. Also during the intermediate tamp, press 165 applies a compression force onto base mix supply 115 so that base mix supply 115 no longer completely fills mold 120. As shown in FIG. 1g, once the intermediate tamp is complete, press 165 returns to the original position.

Figure 1H:
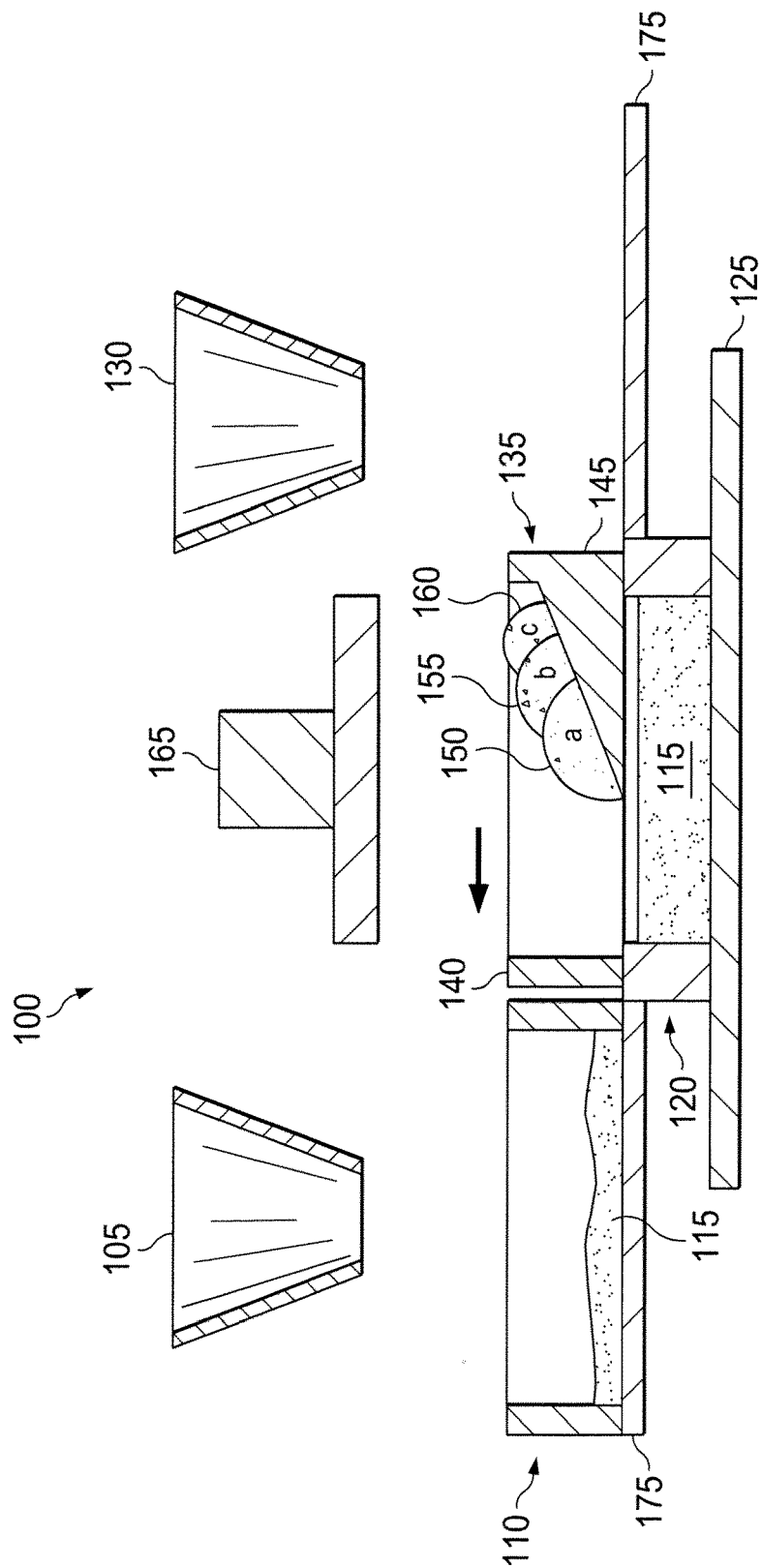
Figure 1I:
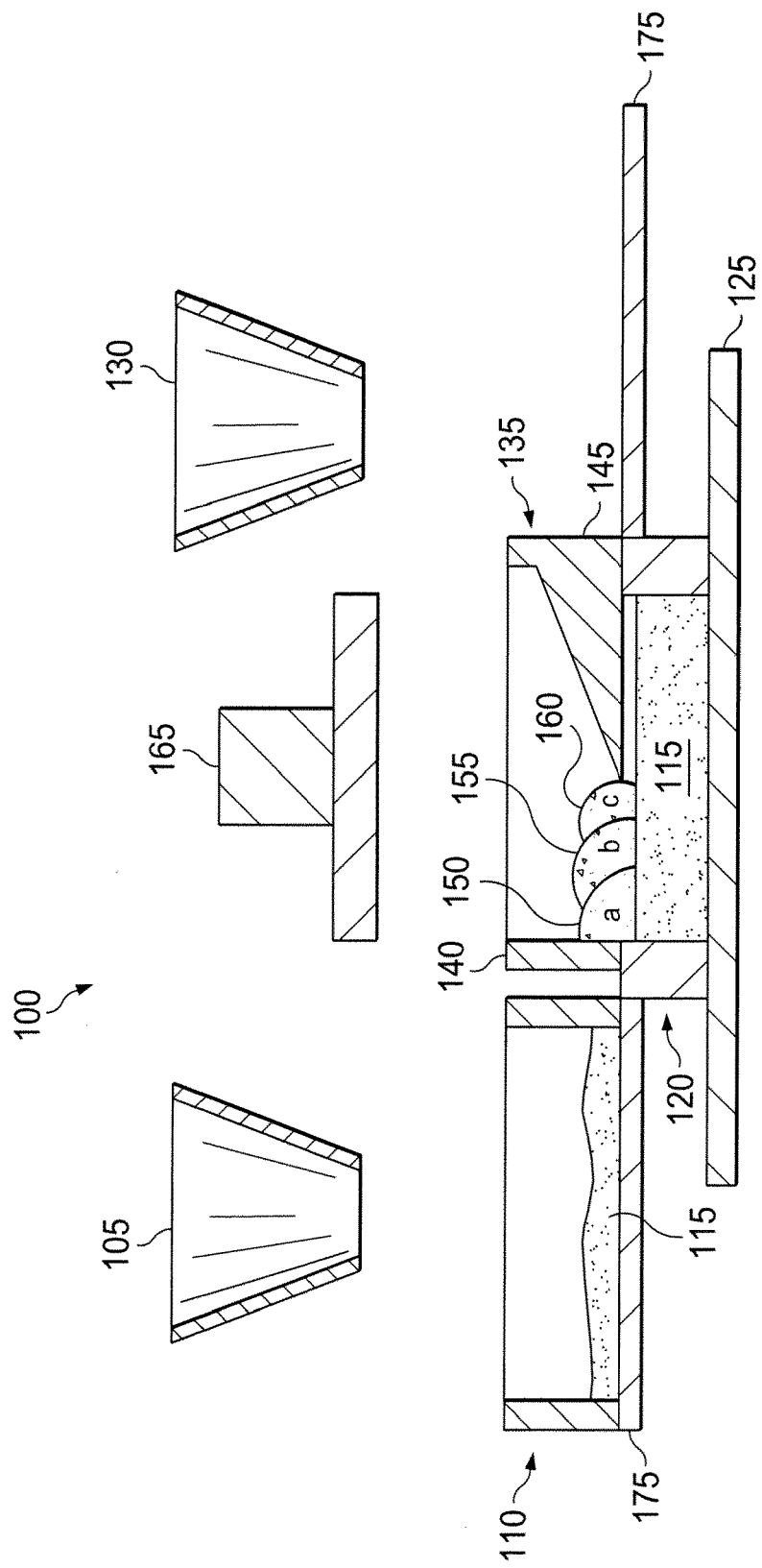
Figure 1J:
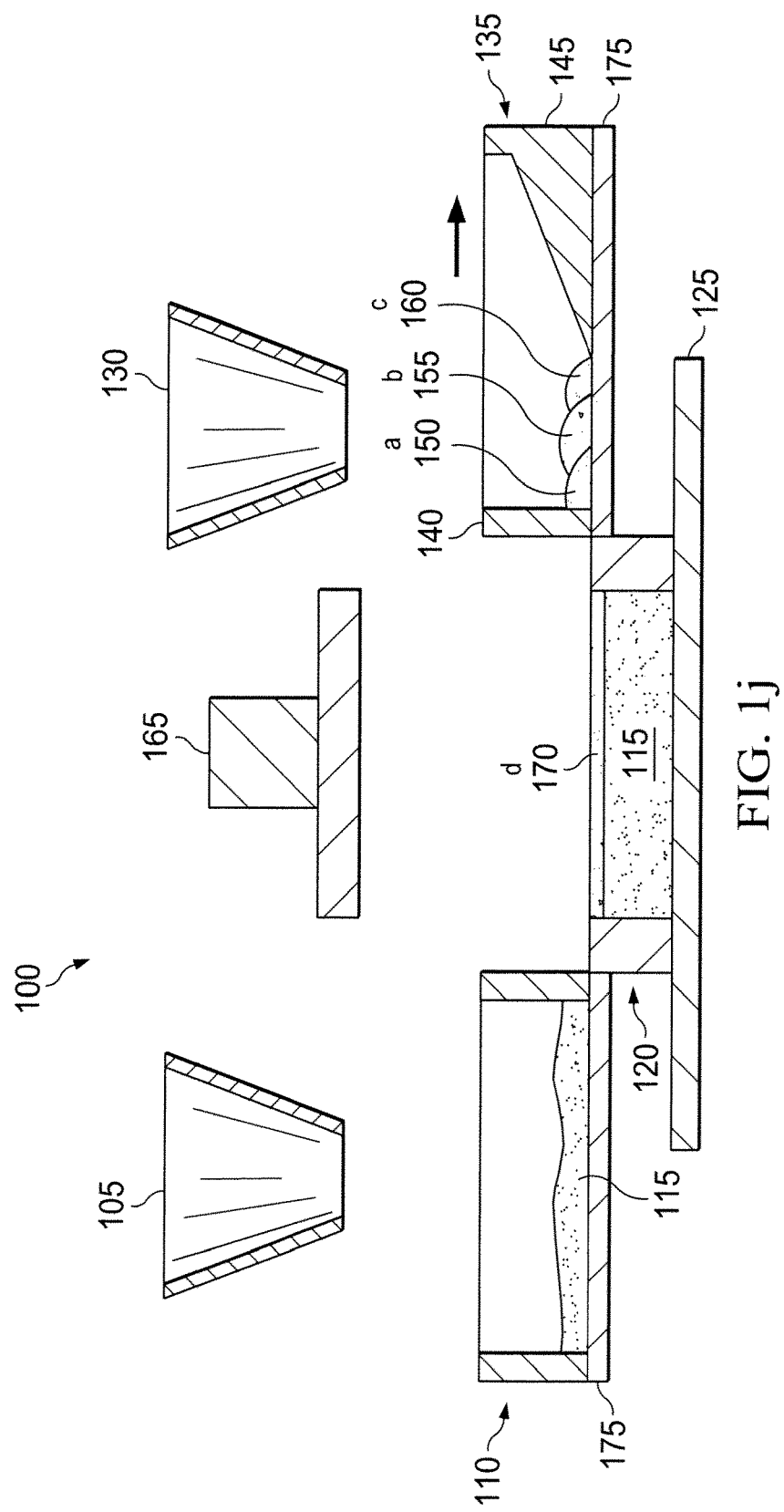

Referring now to FIGS. 1h-1j, once the intermediate tamp is complete, face mix shuttle 135 moves rapidly in a second reference direction over mold 120, as shown by the arrow. During this rapid movement in the second reference direction, face mix materials 150, 155, 160 are not deposited into mold 120, due to the force of the acceleration of face mix shuttle 135 in the second reference direction. However, once face mix shuttle 135 has completed the rapid movement in the second reference direction, face mix shuttle 135 returns to its original position at a slower speed, which permits face mix materials 150, 155, 160 to pass through a space between retainer plate 140 and shovel 145. The deposited face mix materials 170 form an aesthetically-pleasing surface on top of base mix supply 115.

Figure 1K:
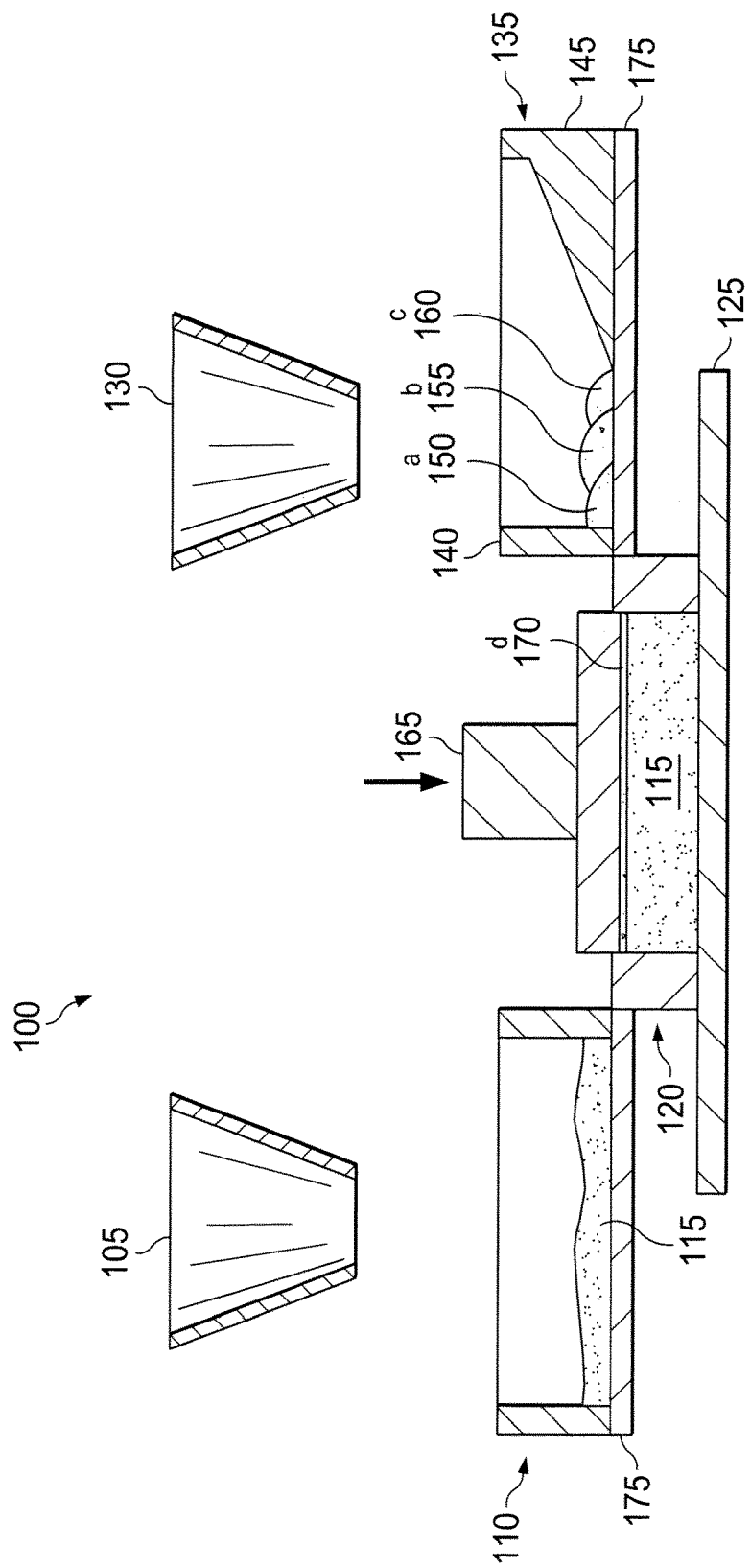
Figure 11:
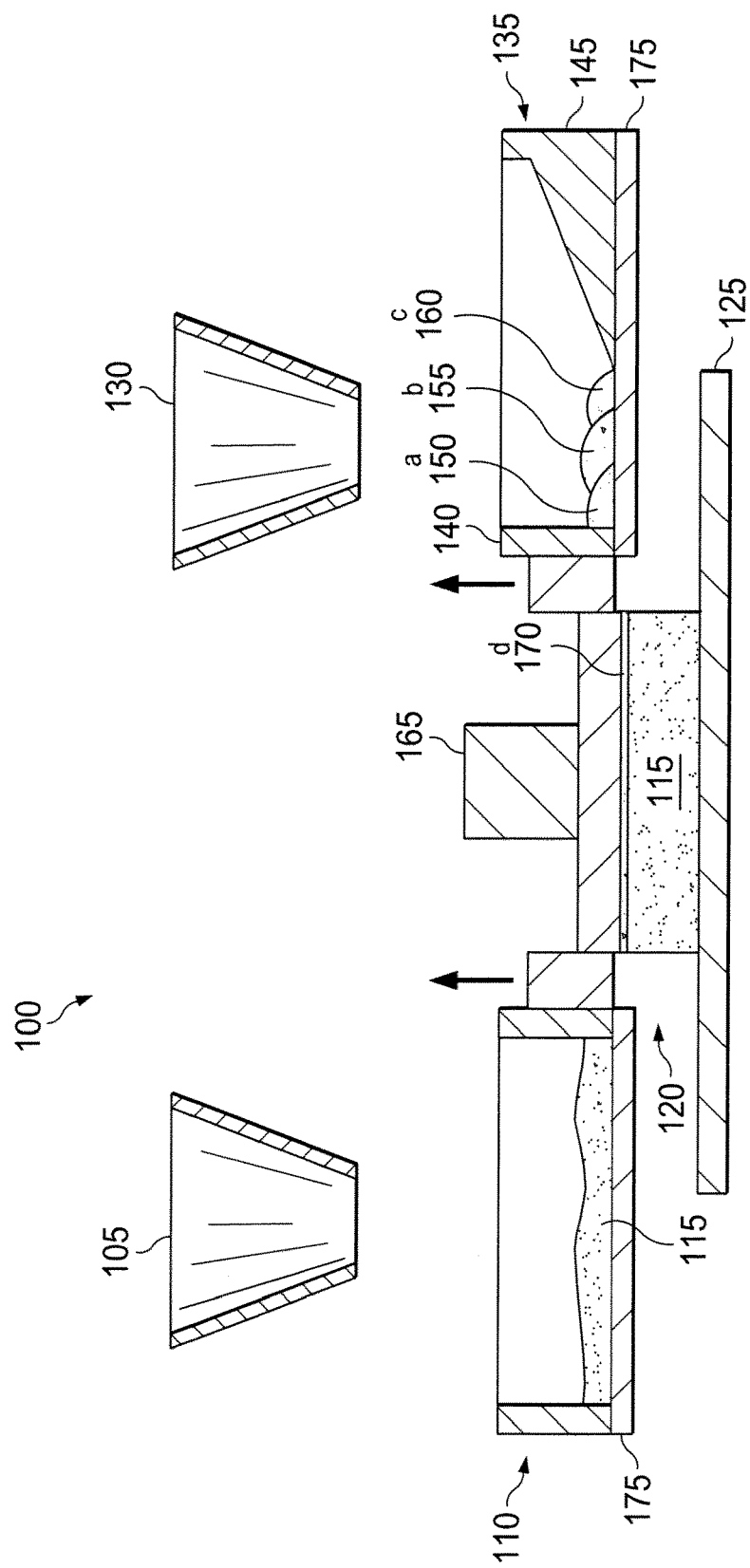

Referring now to FIG. 1k, press 165 is lowered into contact with the top surface of the newly formed concrete block comprising of the base mix supply 115 and face mix materials 170. Press 165 applies a compression force onto the concrete block. After this compression force is applied, a vibrational device associated with press 165 applies a vibration force to mold 120 and the concrete block contained within mold 120.

Figure 1M:
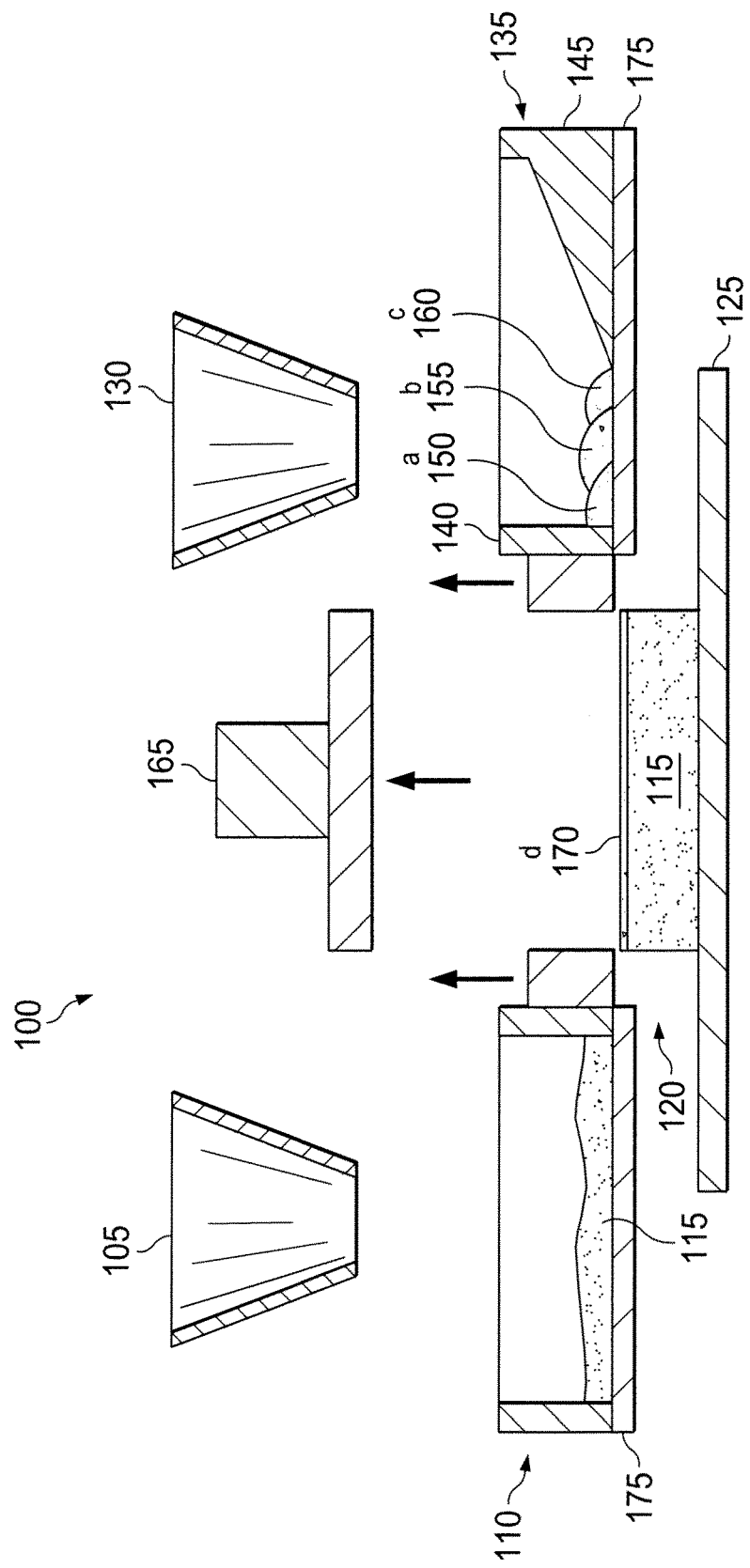

Referring now to FIG. 1l, once press 165 has been applied and a vibration force has been applied to mold 120 and the concrete block, mold 120 is lifted a sufficient distance to expose the concrete block on steel plate 125 in the direction shown by the arrow. As shown in FIG. 1m, press 165 is then lifted off of the top surface of the concrete block. The concrete block is then transported on steel plate 125 to a curing location to allow for heating and curing of the final product. Mold 120 is then lowered to its original position on steel plate 125 and the entire process can be repeated.

Figure 2:
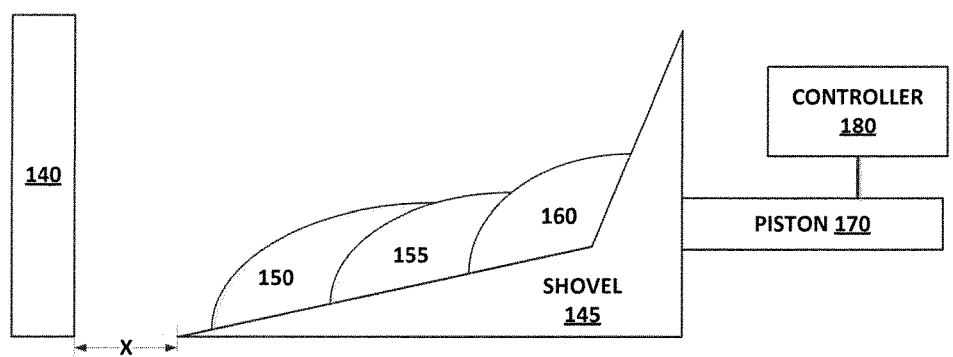
FIG. 2 is a diagram of face mix shuttle in accordance with an exemplary embodiment of the present disclosure.

FIG. 2 is a diagram of face mix shuttle 135 including retainer plate 140 and shovel 145. Shovel 145 is disposed at an angle of between about 60 degrees and about 135 degrees, where the angle can be adjusted to control the amount of mixing and interaction between face mix materials 150, 155, 160, and also to prevent face mix materials 150, 155, 160 from sliding off shovel 145 and outside of face mix shuttle 135 as it is moved. By using shovel 145 instead of a flat wall (as is the case with the base mix shuttle), shovel 145 lifts face mix materials 150, 155, 160 as face mix shuttle 135 moves, such that the arrangement of face mix materials 150, 155, 160 is maintained, and face mix materials 150, 155, 160 do not blend into each other as quickly. In this manner, a clearer demarcation between semi-randomly distributed areas of face mix materials 150, 155, 160 over the top of base mix supply 115 can be realized prior to the application of press 165 onto mold 120. In one embodiment of the present disclosure, the distance X between retainer plate 140 and shovel 145 can be between about 2 inches and about 12 inches. This distance can be increased from inches and decreased from 12 inches in order to control the deposition of face mix materials 150, 155, 160 onto base mix that is contained within mold 120.

Shovel 145 is moved by piston 170, which can be a hydraulic piston or other suitable motive forces that can drive shovel 145 at different and controllable speeds. Controller 180 is a programmable controller or other suitable controllers that can receive programming instructions to provide signals to piston 170 and other components, such as to extend piston 170 at a first speed that is fast enough to cause face mix materials 150, 155, 160 to be lifted as discussed, and to retract piston 170 at a second speed that is slow enough to cause face mix materials 150, 155, 160 to be distributed onto the surface of the base mix that has been deposited within mold 120. Controller 180 can also perform other suitable sequencing operations, as described further herein.

Figure 3:
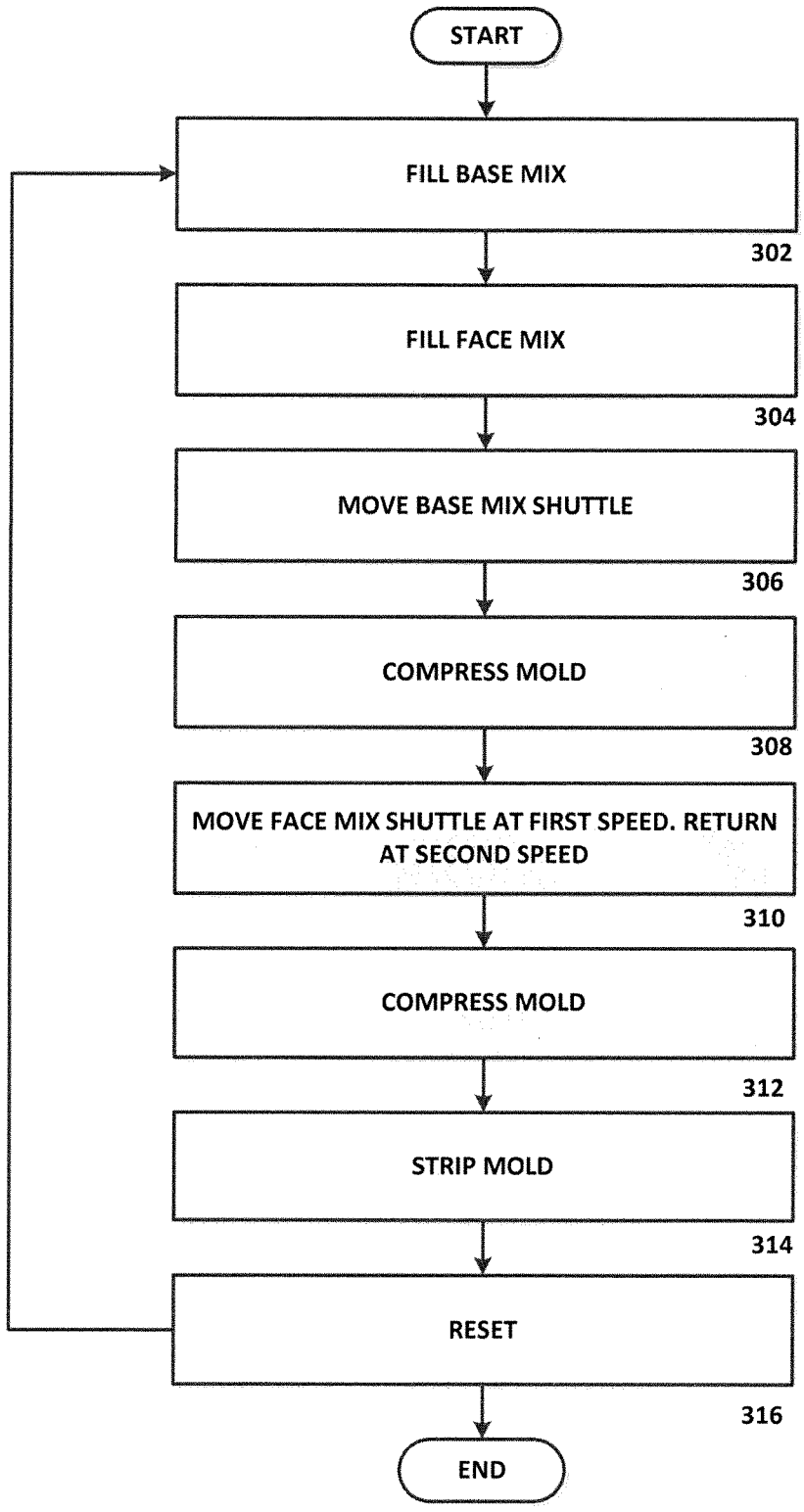
FIG. 3 is a diagram of an algorithm for controlling a manufacturing process, in accordance with an exemplary embodiment of the present disclosure.

FIG. 3 is a diagram of an algorithm 300 for controlling a manufacturing process, in accordance with an exemplary embodiment of the present disclosure. Algorithm 300 can be implemented in hardware or a suitable combination of hardware and software, and can be software operating in a controller of a combined press and shuttle box device as discussed herein.

Algorithm 300 begins at 302, where a fill command is generated to fill a base mix shuttle using the base mix chute. In one exemplary embodiment, the fill command can cause an actuator to open a door from a gravity-fed base mix supply for a predetermined period of time and then to close, so as to allow a predetermined amount of base mix to be provided to the base mix shuttle, or other suitable processes can also or alternatively be used. The algorithm then proceeds to 304.

At 304, a fill command is generated to fill the face mix shuttle using the face mix chute. In one exemplary embodiment, the fill command can cause a plurality of actuators to each open a door in a predetermined sequence from a gravity-fed face mix supply for a predetermined period of time and then to close, so as to allow a predetermined amount of face mix to be provided to the face mix shuttle, or other suitable processes can also or alternatively be used. The algorithm then proceeds to 306.

At 306, a movement command is generated to move the base mix shuttle in a first reference direction over the mold to deposit a base mix supply into the mold. Once the base mix shuttle completes this movement, the base mix shuttle returns to the original position. In one exemplary embodiment, the base mix shuttle can be coupled to a hydraulic piston or other suitable motive devices, and can be moved at a first speed to a position over the mold and then returned to the starting position at a second speed, where the first speed and the second speed can be the same or different. The algorithm then proceeds to 308.

At 308, a press command is generated to cause a hydraulic press or other suitable press devices to be lowered to engage with the base mix materials deposited into the mold. Once the press has exerted a pressure onto the top surface of the materials in the mold, a vibration command is generated to exert a vibration on the contents of the mold for between one-half and two seconds. A release command is then generated to cause the press to return to a position above the mold and out of the way of the face mix shuttle, and the algorithm then proceeds to 310.

At 310, a movement command is generated to move the face mix shuttle in a second reference direction over the mold to deposit a face mix supply into the mold. In one exemplary embodiment, the face mix shuttle can be coupled to a hydraulic piston or other suitable motive devices, which can be actuated to move at a first speed and with an associated acceleration. Based on the acceleration force of the face mix shuttle as it moves in the first direction, the face mix is pushed over the shovel and prevented from falling through the opening, such that no face mix supply is deposited into the mold during the initial trip in the second reference direction. However, once the trip in the second reference direction is completed, the face mix in the face mix shuttle returns to its original position over the opening, and the face mix shuttle is moved in a second direction at a slower speed, so as to allow the face mix to fall through the opening in the face mix shuttle. During this return trip, the face mix shuttle deposits a face mix supply onto the top layer of the base mix supply in the mold. By depositing the face mix supply only during the return trip, the process avoids mixture of the face mix supply deposited during the original movement over the mold and subsequent return trip to the original position. In one exemplary embodiment of the present disclosure, during the return trip of the face mix shuttle the retainer plate contacts and levels a top surface of the face mix supply deposited into the mold. The algorithm then proceeds to 312.

At 312, a press command is generated to cause the press to lower onto and engage with the face mix and base mix materials deposited into the mold, such as by actuating a hydraulic supply to the press or in other suitable manners. Once the press has exerted a pressure onto the top surface of the materials in the mold, a vibration command is generated to exert a vibration on the contents of the mold for between one-half and two seconds. The algorithm then proceeds to 314.

At 314, a movement command is generated to strip the mold from the concrete block contained within the mold. In one exemplary embodiment, the mold can be coupled to a piston or other suitable motive device, and can be raised or lowered to allow the base mix and face mix (which can be disposed on a moveable steel plate or other suitable structures) to be exposed. During the stripping of the mold, the press can remain engaged with the top surface of the base mix and the face mix, which now form an uncured concrete block. Once the mold has been lifted and no longer contacts the concrete block, a command can be generated to cause the hydraulic press to return to an open position. The algorithm then proceeds to 316.

At 316, a reset command is generated wherein the concrete block is transported to a curing location, such as by using a belt drive or other suitable motive devices, and the mold is returned to the original position.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for manufacturing concrete blocks, the method comprising:
   placing a mold into a loading zone of a block press;
   accelerating a face mix shuttle comprising a retainer plate, a shovel, and a face mix supply in a direction generally towards the mold, wherein the acceleration causes the shovel to lift the face mix supply to prevent depositing the face mix supply during the acceleration in the direction generally towards the mold;
   decelerating the face mix shuttle wherein the face mix supply contacts the retainer plate; and
   returning the face mix shuttle to an original position wherein during the return the face mix supply is deposited into the mold through an opening between the retainer plate and shovel of the face mix shuttle.

2. The method of claim 1, wherein the step of returning the face mix shuttle to an original position further comprises using the retainer plate to level a top surface of face mix supply deposited into the mold.

3. The method of claim 1, wherein the step of returning the face mix shuttle to an original position further comprises depositing a face mix onto a top surface of a base mix supply in the mold.

4. The method of claim 1 wherein accelerating the face mix shuttle comprises actuating a piston coupled to the face mix shuttle to move at a first speed.

5. The method of claim 1 wherein returning the face mix shuttle to the original position comprises actuating a piston coupled to the face mix shuttle to move at a first speed.

6. The method of claim 1 wherein accelerating the face mix shuttle comprises actuating a piston coupled to the face mix shuttle to move at a first speed, and wherein returning the face mix shuttle to the original position comprises actuating the piston coupled to the face mix shuttle to move at a second speed.

7. The method of claim 1 wherein decelerating the face mix shuttle comprises stopping a piston coupled to the face mix shuttle.

8. A method for manufacturing concrete blocks, the method comprising:
   placing a mold into a loading zone of a block press;
   accelerating a face mix shuttle comprising a retainer plate, a shovel, and a face mix supply disposed between the retainer plate and the shovel in a direction generally towards the mold, wherein the acceleration causes the shovel to lift the face mix supply to prevent depositing the face mix supply during the acceleration in the direction generally towards the mold;
   decelerating the face mix shuttle wherein the face mix supply contacts the retainer plate; and
   returning the face mix shuttle to an original position wherein during the return the face mix supply is deposited into the mold through an opening between the retainer plate and shovel of the face mix shuttle.

9. The method of claim 8, wherein the step of returning the face mix shuttle to an original position further comprises using the retainer plate to level a top surface of face mix supply deposited into the mold.

10. The method of claim 8, wherein the step of returning the face mix shuttle to an original position further comprises depositing a face mix onto a top surface of a base mix supply in the mold.

11. The method of claim 8 wherein accelerating the face mix shuttle comprises actuating a piston coupled to the face mix shuttle to move at a first speed.

12. The method of claim 8 wherein returning the face mix shuttle to the original position comprises actuating a piston coupled to the face mix shuttle to move at a first speed.

13. The method of claim 8 wherein accelerating the face mix shuttle comprises actuating a piston coupled to the face mix shuttle to move at a first speed, and wherein returning the face mix shuttle to the original position comprises actuating the piston coupled to the face mix shuttle to move at a second speed.

14. The method of claim 8 wherein decelerating the face mix shuttle comprises stopping a piston coupled to the face mix shuttle.

15. A method for manufacturing concrete blocks, the method comprising:
   accelerating a face mix shuttle comprising a retainer plate, a shovel, and a face mix supply disposed between the retainer plate and the shovel in a direction generally towards the mold, wherein the acceleration causes the shovel to lift the face mix supply to prevent depositing the face mix supply during the acceleration in the direction generally towards the mold; and
   decelerating the face mix shuttle at a rate sufficient to cause the face mix supply contacts the retainer plate.

16. The method of claim 15 further comprising returning the face mix shuttle to an original position wherein during the return the face mix supply is deposited into the mold through an opening between the retainer plate and shovel of the face mix shuttle.

17. The method of claim 16, wherein the step of returning the face mix shuttle to an original position further comprises using the retainer plate to level a top surface of face mix supply deposited into the mold.

18. The method of claim 16, wherein the step of returning the face mix shuttle to an original position further comprises depositing a face mix onto a top surface of a base mix supply in the mold.

19. The method of claim 15 wherein accelerating the face mix shuttle comprises actuating a piston coupled to the face mix shuttle to move at a first speed.

20. The method of claim 16 wherein returning the face mix shuttle to the original position comprises actuating a piston coupled to the face mix shuttle to move at a first speed.

* * * * *